March 17, 1970    H. A. EBERHARDT ET AL    3,500,961
PRESSURE BALANCED BEARING LUBRICATION SYSTEM Filed Jan. 16, 1968      2 Sheets-Sheet 1

INVENTORS:
HARRY A. EBERHARDT
EVERT J. WENDELL
BY Howson & Howson
ATTYS.

INVENTORS:
HARRY A. EBERHARDT
EVERT J. WENDELL
BY *Howson & Howson*
ATTYS.

United States Patent Office 3,500,961
Patented Mar. 17, 1970

3,500,961
PRESSURE BALANCED BEARING LUBRICATION
SYSTEM
Harry A. Eberhardt, Paoli, and Evert J. Wendell, Wayne,
Pa., assignors to Hale Fire Pump Company, Conshohocken, Pa., a corporation of Pennsylvania
Filed Jan. 16, 1968, Ser. No. 698,174
Int. Cl. F16n 13/20; E04d 29/00
U.S. Cl. 184—31                                    10 Claims

ABSTRACT OF THE DISCLOSURE

In apparatus for handling a primary fluid including a fluid chamber, a reservoir for a secondary fluid, and a seal for separating the primary and secondary fluids, means for substantially balancing the pressure of the secondary fluid and the primary fluid in the region of the seal. In some instances a rotatable member is supported on a bearing and the fluid in the reservoir is a lubricant wherein the lubricant is circulated from the reservoir through the bearing.

More specifically the present invention is directed to an integrated substantially balanced pressure bearing lubrication system for centrifugal pumps of the type having an intake or suction side, a discharge side and an impeller mounted on an impeller shaft suitably connected to a source of power to drive the same for pumping high pressure fluids such as water. The pressure balanced lubrication system is disposed adjacent one end of the impeller shaft and is designed to protect the bearing, for example, a sleeve-type bearing in which the outboard end of the impeller shaft is journalled. A seal is also mounted on the impeller shaft adjacent one axial end of the sleeve bearing. The pressure balanced lubrication system of the present invention consists of a chamber divided by means of an elastic diaphragm into a lubrication reservoir section and a pressure balancing section.

The reservoir section, which is filled to capacity with a suitable lubricant, communicates with an annular passage adjacent the seal and the pressure balancing section communicates with the intake side of the pump. Accordingly, in operation the pressure on either side of the seal is substantially balanced as described in more detail hereinafter. A porting arrangement in the impeller shaft communicating at one end with the lubricant reservoir section and at the opposite end with the annular space adjacent the seal provides an auxiliary pumping system which automatically circulates lubricant through the bearing.

This invention relates to centrifugal pumps and has particular application on mobile pumps which operate under variable inlet pressure such as those used on fire fighting equipment to deliver water under high pressure to hose lines. These pumps are generally mounted on the fire truck and are driven through a transmission system by the engine of the truck. These pumps generally comprise a pump casing or housing assembly having at least one inlet section connected to a suitable source of water such as a fire hydrant or body of water such as a river, a rotary shaft mounted in the housing and connected through suitable drive connections to the main drive system, an impeller mounted on the shaft which converts the low pressure water supply entering the inlet section of the pump to high pressure on the discharge side.

In conventional centrifugal pumps, the impeller shaft is generally mounted in ball bearings spaced away from the main housing and protected from the fluid in the housing by means of packing glands or seals on each end of the housing. This type of bearing arrangement presents certain problems and disadvantages on pumps of this type and particularly on pumps used on fire fighting equipment that must be compactly oriented with very limited accessibility to the pump. Most fire pumps presently in service consist of two stages having a pair of impellers so that one impeller pumps into the second impeller. In these arrangements the second impeller functions with an elevated inlet pressure, usually in the range of 75–125 p.s.i. and in some cases as high as 350 p.s.i. At these elevated pressures, it becomes more difficult to provide an effective packing-sealing arrangement and therefore, on a two stage design it may be especially desired to eliminate the packing gland on the high pressure end of the pump. However, to simplify the description of the pump, a single-stage design is illustrated herein. Additionally, the design set forth herein lends itself to a compact arrangement requiring a minimum of space and maintenance because only one packing gland is employed on the impeller shaft. The conventional packing-sealing arrangement described above had additional disadvantages. For example, the pressure differential on opposite sides of the seal causes water and foreign matter to leak past the packing gland or seal. In some cases this results in failure of the ball bearings over a comparatively short period of use necessitating disassembly of the pump and replacement of the bearings. It is a particularly difficult and time consuming job on fire fighting equipment because of the fact that it is compactly oriented and has limited accessibility.

Furthermore, in conventional pumps with bearings located distantly from the impeller, radial force loads from the impeller may cause excessive shaft deflection which in turn causes packing leakage and premature wear to such parts as: clearance rings, packing rings, pump shaft under the packing, and in some instances, the support bearings themselves as noted above.

With the foregoing in mind, an object of the present invention is to provide an integrated pressure balanced bearing lubrication system for centrifugal pumps which overcomes the disadvantages and drawbacks of the conventional impeller supporting arrangement discussed above. To this end, the system includes a chamber at one end of the impeller shaft divided by an elastic diaphragm into a lubrication reservoir section and a pressure balancing section. This one end of the impeller shaft is journalled in a sleeve-type bearing and a lip-type oil seal is provided adjacent one axial end of the bearing. The pressure balancing section is in fluid communication with the intake manifold section of the pump and the lubrication reservoir section communicates with an annular passage between the sleeve bearing and the seal, in the present instance by a port arrangement including axial and radial conduits in the impeller shaft. This provides circulatory flow of lubricant automatically from the reservoir section through the bearing whenever the shaft rotates. Thus, the life of the lubricated sleeve-type bearing is extended. Furthermore the bearing is cooled by the circulation of oil, and the oil is kept cool because its reservoir is surrounded by cold water chambers. Additionally by this arrangement the sleeve bearing may be located adjacent the impeller close to the source of the radial load force to minimize shaft deflection and thereby in turn eliminate the problems of shaft deflection as noted above. Moreover, as a result of the pressure balancing diaphragm and the pumping action of the port arrangement in the impeller shaft, the oil pressure on one side of the seal is maintained at a 1 to 4 p.s.i. level above the water pressure on the other side of the seal while the pump is running normally. This arrangement alleviates sealing problems, insures exclusion of foreign matter and provides good lubrication for both the bearing and the seal, insuring long life of both. Additionally, with the improved shaft support and resulting decrease in shaft deflection, there will be less leakage at the packing rings at the other side of the impeller and subsequently less adjusting and less wear on the pump shaft under the packing rings, thereby eliminating excessive "weepage."

Another object of the present invention is to provide a pressure balanced lubrication system for supplying lubricant to the bearing and seal on the impeller shaft of a pump in a manner whereby the fluid pressure on either side of the seal is substantially balanced.

Still another object of the present invention is to minimize shaft deflection by locating the sleeve-type bearing close to the impeller, thus minimizing packing leakage and wear to parts of the pump assembly such as clearance rings, packing rings, the pump shaft and support bearings.

A further object of the present invention is to provide a pressure balanced bearing lubricant system insuring lubrication of the sleeve bearing at all times even when the pump is running dry, for example, during priming or loss of water supply.

A still further object of the present invention is to provide a pressure balanced bearing lubrication system for a pump wherein the lubricant is maintained cool, the arrangement having a self draining feature to prevent freeze-up when the equipment is exposed to low temperatures.

Another object of the present invention is to provide a pressure balanced bearing lubrication system for a pump which is of simplified design which requires a minimum of maintenance and which is easily accessible for assembly and disassembly.

Yet another object of the present invention is to provide a pressure balanced bearing lubrication system for a pump comprising a chamber divided by means of an elastic diaphragm defining a lubrication reservoir section to lubricate the sleeve-type bearing and a pressure balancing section in fluid communication with the intake side of the pump whereby lubrication of the sleeve bearing is insured even if the diaphragm or lip seal should fail.

These and other objects of the present invention and the various features and details of the operation and construction of a novel bearing lubrication and seal arrangement for centrifugal pumps are hereinafter more fully set forth with reference to the accompanying drawings, wherein.

Figure 2:
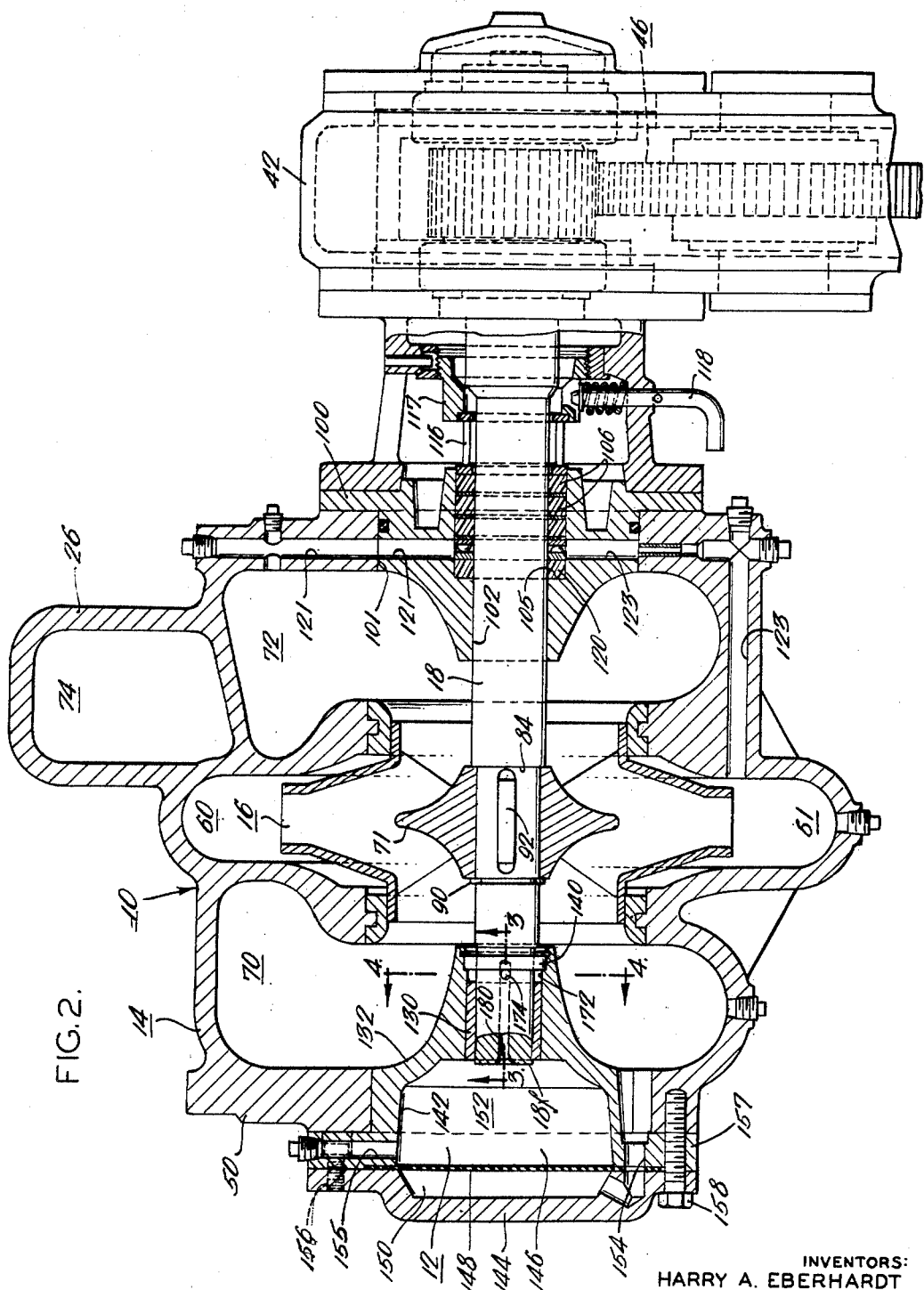
FIG. 2 is an enlarged sectional view taken through the pump on lines 2—2 of FIG. 1.

FIGS. 3 and 4 are enlarged sectional views taken on lines 3—3 and 4—4 respectively of FIG. 2.

Figure 1:
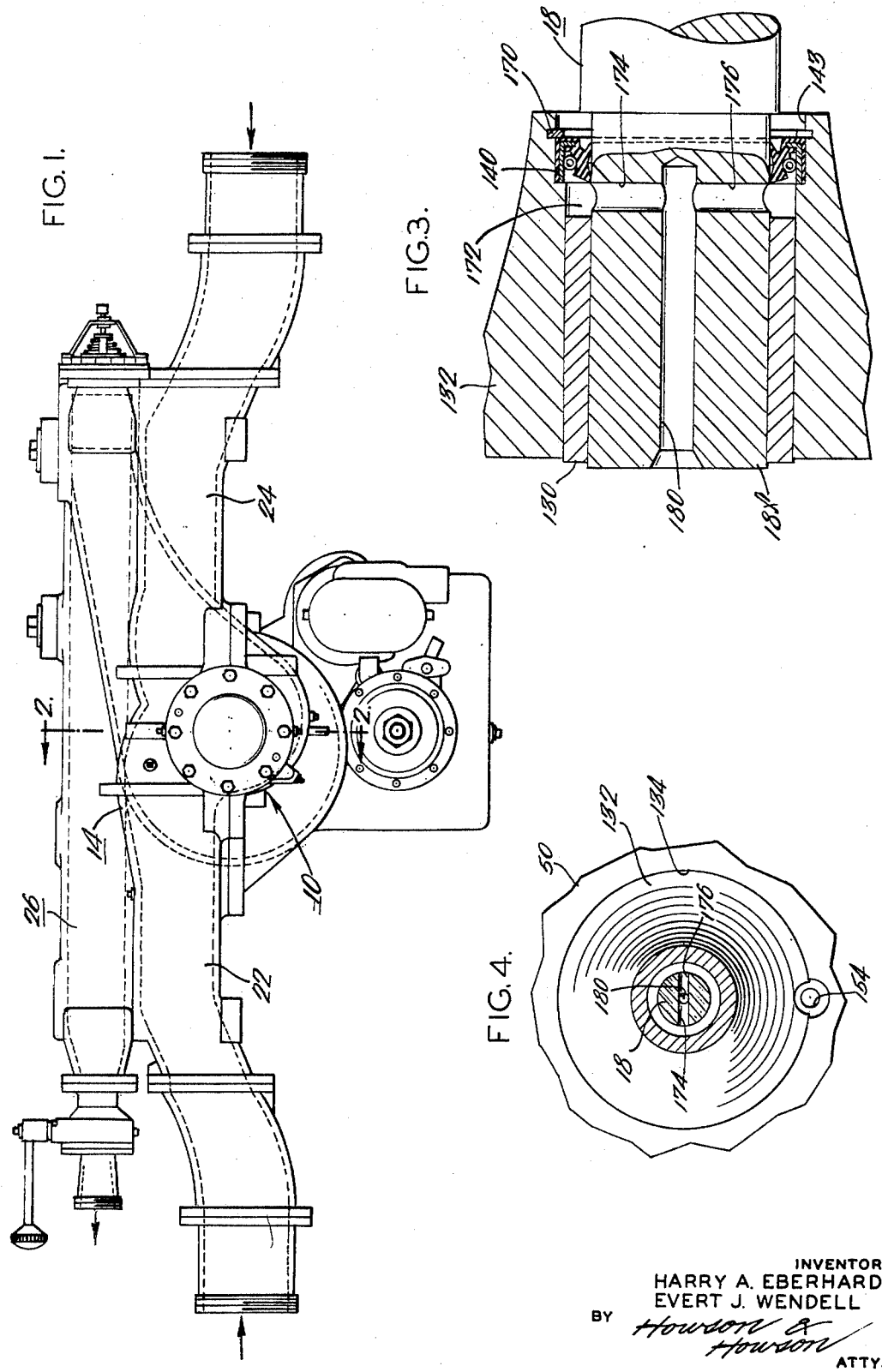
FIG. 1 is a side elevational view of a centrifugal pump incorporating a pressure balanced bearing lubrication system in accordance with the present invention.

Referring now to the drawings, and particularly to FIG. 1 thereof, there is illustrated a centrifugal pump generally designated by the numeral 10 and incorporating a pressure balanced bearing lubrication system in accordance with the present invention.

Even though the pump illustrated is a single-stage type, the invention has application to multiple stage pumps as well as other types.

In the present instance, the pump comprises a main body or casing 14, an impeller 16 mounted on an impeller shaft 18 rotatably supported in the pump casing, a pair of inlet or suction conduits 22 and 24 and two or more discharge conduits 26. The inlet conduits are adapted to be selectively connected to a suitable source of water and the discharge conduits are adapted for attachment to hose lines. The pair of inlet conduits are provided for convenience on fire fighting equipment to permit easy hookup to a water source depending on where it is located relative to the vehicle and to the pump.

Suitable passageways, chambers, and the like are provided in the pump casing so that in the operation of the pump and rotation of the impeller, flow of fluid is effected through the pump from the inlet ports to the discharge ports. Accordingly, low pressure water entering the pump through the inlet conduits 22 or 24 is converted by the impeller and its attendant passages to high pressure water discharged at the discharge conduits 26 to supply a plurality of hose lines connected thereto.

As best illustrated in FIG. 2, the impeller shaft projects outwardly from the rear of the casing 14 and, in the present instance, is driven by a suitable gear train 46 selectively connected to the drive line of a fire truck. One end of the impeller shaft adjacent the gear train, as is conventional is journalled in ball bearings supported in the gear housing 42.

Considering now more specifically the structural details and the arrangement of the pump and with reference to FIG. 2, the pump casing includes a plurality of chambers, compartments and sections. More specifically, the pump casing includes in this instance a single annular impeller chamber 60 containing an impeller 16 of the double-suction type, well known in the art. Two inlet chambers 70 and 72 are provided on either side of the impeller chamber, these inlet chambers both communicate with the inlet conduits 22 and 24. As illustrated, each of the inlet chambers communicates interiorly of the pump casing with the eye of the impeller. The casing further includes a discharge chamber section 74 which communicates with the discharge conduits 26 and a diversion nozzle which communicates with a scroll-like discharge volute 61 formed by the outer walls of impeller chamber 60. The impeller shaft 18 is of a step configuration defining a shoulder 84 against which one axial end of the hub 71 abuts. A locking ring 90 confronts the opposite end of the hub to fix the impeller on the shaft against axial displacement. A conventional key 92 is provided to prevent rotational movement of the impeller relative to the shaft upon rotation of the shaft.

A packing housing 100 is mounted in an opening 101 in the rear wall of the intake chamber 72. The packing housing has an opening 102 through which the impeller shaft extends, this opening being enlarged to provide an annular pocket 105 containing a plurality of packing seal rings 106. These seal rings are compressed and held in the pocket 105 by a follower ring 116 which in turn is moved axially by the threaded adjustment ring 117. The adjustment ring is held in place by a spring biased locking pin 118 so that the packing rings may be selectively adjusted. The assembly also includes a lantern spacer ring 120 which is aligned with passageways 121 and 123 in the packing housing and casing communicating respectively with the suction intake chamber 72 and the discharge volute 61. This arrangement, which is conventional, facilitates cooling of the packing and maintaining a positive pressure in the packing area to prevent suction of air in the event of a vacuum in the pump if on "draft," for example, in drawing water from a lake or river.

The front terminal end of the impeller shaft 18 designated 18f is journalled in a sleeve-type bearing 130 press fitted in a bearing housing 132 which is mounted in an opening in the front wall 50 of the intake chamber 70.

In accordance with the present invention, a pressurized chamber 12 is provided for supplying lubricant to the bearing and seal in a way that substantially balances the fluid pressure on either side of the lip type seal 140. To this end, the front bearing housing 132 is formed with an enlarged cavity 142 which, together with the front cover 144 mounted over the cavity, provides a generally enclosed chamber. A movable member, in the present instance an elastic diaphragm 148, divides the chamber into a front pressure-balancing section 150 and a lubrication reservoir section 152. The pressure balancing section 150 communicates with the intake manifold through a passage 154. A radial port 155 is provided in the extended wall portion of the front bearing housing for filling the oil reservoir chamber section with a suitable fluid such as oil. As best illustrated in FIG. 3, the seal 140 is press fitted in an enlarged recess 143 in the bore of the front bearing housing and a retaining ring 170 is provided to insure against axial displacement. The seal 140 is spaced from the sleeve bearing 130 to refine an annular space 172 which is in fluid communication with the oil reservoir section through a pair of aligned radial ports 174 and 176 in the front terminal end of the impeller shaft 18 and an axial bore 180.

The front cover is tapped at 156 for being independently bolted to the bearing housing by a pair of socket head capscrews, the heads of these screws being countersunk in the bearing housing flange 157. Thus, the bearing housing, with its bearing and seal, the diaphragm, and the cover make up an independent sub-assembly. This sub-assembly is then bolted to the body with the cap screws 158. This arrangement facilitates easy initial assembly and disassembly when necessary to replace the sleeve bearing or oil seal.

Considering now the operation of the pump, and in particular, the pressure balance lubrication system of the present invention, assume that the oil reservoir cavity has been filled to capacity and that the pump is connected to a fire hydrant and operating normally. Under these conditions, water at hydrant pressure enters the intake manifold section of the pump, passes through the port 154, fills the pressure balancing section 150 and exerts a pressure against the elastic diaphragm which, in turn pressurizes the lubricant in the chamber 152 and annular space 172. Thus, the pressure on the lubricant side of the seal becomes approximately equal to the water pressure on the opposite side of the seal. It is noted that any change of pressure in the intake section would be immediately reflected by a corresponding change in pressure in the annular cavity 172 so that the pressure acting on either side of the seal is substantially uniform during any operating condition.

Whenever the shaft is rotating, the cross-drilled holes 174 will act as impelling chambers imparting centrifugal force to the lubricant. This force will generate a low pressure in accordance to the basic principles of a centrifugal pump with the shaft diameter, in this instance, considered to be the impeller diameter. Thus, for this integral pump; the axial hole 180 may be considered the suction chamber; radial holes 174, the impeller passages; and annular space 172, the discharge chamber. This pumping system will then lubricate and cool the bearing by circulating oil through it at a rate proportional to the shaft speed and a pressure of approximately 1 to 4 p.s.i. above the oil chamber pressure. Furthermore, it is noted that the lubricant is kept cool because its reservoir is surrounded by cold water chambers.

To lubricate a water pump's integral sleeve bearing with oil, it is necessary to provide a seal to keep the oil and water separated. The type of seal that offers the most optimum combination of minimum space, maximum sealability, and minimum cost is the common molded rubber "lip" type seal known commercially as an oil seal. However, this type of seal has the inherent disadvantage of only being able to seal at very low pressures, usually less than 10 p.s.i. A further disadvantage of this type of seal, in conventional arrangements, is that in the presence of erosive particles it will wear a groove in its mating shaft with subsequent leakage.

The unique lubricant pumping arrangement described herein creates a slightly higher pressure with the clean oil than we have with the dirt laden water on the opposite side of the seal. Therefore, any flow or weepage will be from the clean oil toward the contaminated erosive particle laden water. It may be seen from the foregoing description how the inherent disadvantages of the lip type seal have been overcome to facilitate its use on this application. That is, the nearly perfect pressure balance plus the slight additional oil pressure on the seal will insure a clean lubricant under the lip of the seal giving the seal and shaft an extremely long life. The resultant benefits are the prevention of dirt particles in the water from getting to the bearing surfaces and containment of bearing lubricant.

Because of the small space requirements of the lip type oil seal, it is possible to obtain advantages of low friction and minimum wear with the lubricated sleeve bearing and still place it in close proximity of the impeller, and its resultant radial forces, without obstructing the flow passages to said impeller. Thus, shaft deflection and consequent wear on the impeller's mating clearance rings and other close-running fits is kept to a minimum. Even the sleeve bearing itself is less subject to concentrated wear when the shaft deflection is minimized. Additionally, with the improved shaft support and resultant decrease in shaft deflection, there will be less leakage or "weepage" at the packing rings 120 and subsequently less adjusting and less wear on the pump shaft under the packing rings.

Because of the unique balancing arrangement with the elastic diaphragm, the absolute pressure in the oil chamber and next to the oil seal will approximately equalize the absolute pressure in the pump inlet chamber no matter whether the pressure is unusually high, such as 350 p.s.i., which may be encountered when pumping a two stage pump at very high pressure, on a strong hydrant, or in relay with another pumper, or lower than atmospheric pressure such as the high vacuum obtainable when pumping water from a river or pond with a high suction lift. Furthermore, this elastic diaphragm can "follow-up" and maintain the pressure balance even though a considerable amount of the oil chamber capacity has been consumed through miniscule leakage across the lip seal over a long period of time. Occasionally, in the fire service, the pump must run without water in it, for instance, while priming or when pumping out of a mobile tank and not realizing the instant the tank is emptied. In this case, the sleeve bearing will still be lubricated and cooled by the oil circulating through it. In this regard, the flexible diaphragm has yet another advantage: as the oil picks up heat, even though it fills a closed chamber, it will not develop excessive pressure because when it expands, it merely stretches the diaphragm. Another advantage of this arrangement is the self draining feature, that is, whenever the main pump is drained, water will automatically drain from the balancing recess behind the diaphragm to prevent freezing when the fire truck is exposed to low temperatures.

A further advantage of this lubrication system is the simplicity and automatic nature of the device. Whenever the shaft rotates, lubricant will be circulated through the bearing. The load on the bearing usually goes up with increased water pressure which results from increased shaft speed which also causes an increase in the volume of lubricant circulated and subsequent cooling of the bearing. Thus, the arrangement set forth herein will require a minimum of attention and maintenance—a very important feature on mobile fire pumps because of their inaccessibility. Should the pump bearing and lube system require servicing, because of the structural arrangement, it may be performed with a minimum of effort since all of the components, except the shaft, may be removed and replaced as a single pre-assembled unit.

The design arrangement set forth herein would not cease to function while pumping water on emergency fire service, even if the elastic diaphragm or lip seal should fail. In this event, the sleeve bearing would continue to function with water lubrication. The water pumped by the circulating system built into the shaft would tend to have a considerably lower concentration of solids because of the centrifugal action at the end of the shaft. Thus, the sleeve bearing would be cooled and lubricated with cleaner water than that being handled by the main pump.

With the invention set forth herein, all of these advantages have been realized in an economical, practical manner with a minimum amount of space required—an important feature for pumps used in compactly oriented mobile vehicle such as fire trucks.

Even though the present invention has been illustrated and described in connection with a centrifugal pump, the balanced pressure lubrication system has application to other types of pumps, for example, axial and rotary and other types of fluid handling apparatus, for example compressors.

While particular embodiments of the present invention have been illustrated and described herein, it is not intended to limit the invention to such disclosure and changes and modifications may be made.

We claim:

1. In a fluid handling apparatus having a fluid chamber and including a rotatable member supported in a bearing, and a seal mounted on said rotatable member adjacent said fluid chamber and spaced from said bearing to define an annular space therebetween, a lubrication system for said bearing including a lubrication reservoir and porting means in the rotatable member communicating with said lubrication reservoir and said annular space whereby upon rotation of said rotatable member a pumping action is provided effecting continuous circulation of lubricant in a path from said reservoir through said porting means, annular space, bearing and back to said reservoir.

2. In apparatus as claimed in claim 1 wherein said means providing circulation of the lubricant consists of axial and radial porting in said rotatable member communicating with said reservoir and said bearing.

3. In a fluid handling apparatus having a fluid chamber and including a rotatale member supported in a bearing, and a seal mounted on said rotatable member adjacent said fluid chamber and spaced from said bearing to define an annular space therebetween, a lubrication system for said bearing including a lubrication reservoir, means for maintaining the pressure in the lubrication reservoir substantially the same as in the fluid chamber and porting means in the rotatable member communicating with said lubrication reservoir and said annular space whereby upon rotation of said rotatable member a pumping section is provided effecting circulation of lubricant in a path from said reservoir through said porting means, annular space and bearing and also effecting a slightly higher pressure in said annular space than in said fluid chamber.

4. In fluid handling apparatus having a fluid chamber and including a rotatable member, and a seal mounted on said rotatable member, an annular space adjacent said fluid chamber on one side of said seal remote from said fluid chamber, a lubrication system including a lubrication reservoir, means for maintaining the pressure in the lubrication reservoir substantially the same as in the fluid chamber and porting means in the rotatable member communicating with said lubrication reservoir and said annular space whereby upon rotation of said rotatable member a pumping action is provided effecting circulation of lubricant in a path from said reservoir through said porting means and annular space and also effecting a slightly higher pressure in said annular space than in said fluid chamber.

5. In a pump of the type having a casing, inlet and discharge conduits in the casing and an impeller mounted on an impeller shaft rotatably mounted in an impeller chamber in the casing, the impeller shaft being supported at one end in a bearing and a seal adjacent the bearing and spaced therefrom to define an annular space, the improvement comprising a substantially balanced pressure lubrication system consisting of means defining a chamber adjacent one axial end of the pump divided by a movable member into a pressure balancing section and a lubrication reservoir section for a supply of lubricant, means providing fluid communication between the pressure balancing section and the impeller chamber and porting means in said impeller shaft providing fluid communication between the lubricant reservoir section and said annular space thereby upon rotation of said rotatable member a pumping action is provided effecting circulation of lubricant in a path from said reservoir through said porting means, annular space and bearing and also effecting a slightly higher pressure in said annular space than in said fluid chamber.

6. In a pump as claimed in claim 5 wherein said bearing is a sleeve-type bearing mounted adjacent one axial end of the impeller shaft.

7. In a pump as claimed in claim 6 wherein said lubricant reservoir section is disposed adjacent said one axial end of the impeller shaft and the means providing fluid communication between the lubricant reservoir section and said annular space between the bearing and seal consists of a port arrangement in said impeller shaft.

8. In a pump as claimed in claim 7 wherein said port arrangement consists of an axial bore in the impeller shaft and aligned radial ports communicating at their inner ends with said axial bore and at their outer ends with said axial space.

9. In a pump as claimed in claim 5 wherein said movable member comprises a flexible diaphragm.

10. In a pump as claimed in claim 9 wherein said chamber mounting said diaphragm is defined by a bearing housing and a front cover detachably mounted to said casing.

References Cited

UNITED STATES PATENTS

| | | |
|---|---|---|
| 1,026,101 | 5/1912 | Marsh. |
| 1,721,737 | 7/1929 | Joyce. |
| 1,835,877 | 12/1931 | Joyce. |
| 1,859,039 | 5/1932 | Joyce. |

FRED C. MATTERN, Primary Examiner

MANUEL A. ANTONAKAS, Assistant Examiner

U.S. Cl. X.R.

103—111